3,284,518
HALOALKYLATION OF AROMATIC COMPOUNDS
George W. Ayers, Chicago, and William A. Krewer, Arlington Heights, Ill., assignors, by mesne assignments, to Union Oil Company of California, Los Angeles, Calif., a corporation of California
No Drawing. Filed Oct. 29, 1962, Ser. No. 233,912
7 Claims. (Cl. 260—651)

This invention relates to a process of preparing halomethylated derivatives of organic compounds having one or more replaceable hydrogen atoms attached to an aromatic ring or heterocyclic ring with aromatic properties, and to the products of such process.

The halomethylation reaction as applied to form chloromethylated and bromomethylated products is of value in organic syntheses because the chloromethyl or bromomethyl group can be easily converted to other groups such as —COOH, —CH$_2$OH, —CHO, —CH$_2$CN, and —CH$_3$.

The chloromethylation reaction, as illustrated by the classic example of Grassi and Maselli (Gazz. Chim. Ital., 28, II, 477 (1898)), involves the replacement of a hydrogen atom on a cyclic nucleus of aromatic character by a chloromethyl group in a single operation. Thus, Grassi and Maselli found that benzene, hydrogen chloride, paraformaldehyde and zinc chloride react as follows:

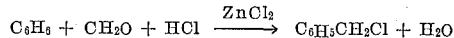

$$C_6H_6 + CH_2O + HCl \xrightarrow{ZnCl_2} C_6H_5CH_2Cl + H_2O$$

Other catalysts, such as sulfuric acid, acetic acid, stannic chloride or phosphoric acid, can be used in the reaction. For some starting materials no catalyst is required. Chloromethylether can be used in place of formaldehyde and hydrogen chloride in the reaction.

During the investigation of ways of preparing carbinyl phosphate derivatives from aromatic compounds using phosphorus oxychloride and paraformaldehyde as the reactants, it was found that, contrary to expectations, carbinyl phosphates were not formed and that the aromatic compounds were chloromethylated. This is totally unexpected since a study of the prior art on the reactions of phosphorus oxychloride leads one to the conclusion that aryl carbinyl phosphates will be formed. This discovery is described in detail in copending application Serial No. 855,257, filed November 25, 1959, by G. W. Ayers and W. C. Allinder (now United States Patent 3,076,039).

One problem has existed in all of the halomethylation reactions, namely the formation of varying quantities of diarylmethane by-products which substantially reduces the yield of the desired halomethylated products. The instant invention is based upon the discovery that by conducting the process of copending application Ser. No. 855,257 in the presence of a hydrohalic acid, not only is the yield of halomethylated products increased and the formation of undesired diarylmethane by-products decreased, but, quite unexpectedly, the reaction, through the presence of the hydrohalic acid, becomes selective for the formation of para-halomethylated products. This discovery is particularly applicable where the aromatic starting material contains substituent groups attached to the aromatic ring which are ortho-para orienting.

This discovery, when applied to an aromatic hydrocarbon like toluene, results, quite unexpectedly, in the production of p-(chloromethyl)toluene, also known as ω-chloro-p-xylene, in 95 to 98% purity from which practically pure terephthalic acid can be produced by oxidation. This eliminates the necessity of separating ortho and meta isomers from the acid mixture.

As applied to organic compounds having one or more replaceable hydrogen atoms connected to nuclear carbon atoms generally, such as are described in copending application Serial No. 855,257, or as applied to toluene specifically, the hydrohalic acid is introduced into the reaction in several ways in accordance with this invention. The improvements disclosed herein, that is, the reduction of the formation of diaryl methane by-products to give increased yields of the desired halomethylated products and the formation of the para isomer of halomethylated toluene to the substantial exclusion of the ortho isomer, are obtained by providing the hydrohalic acid for the reaction through the direct addition thereof in gaseous form during the reaction. Also, the hydrohalic acid can be generated in situ by employing an excess of the phosphorus oxyhalide and sufficient water to decompose this excess through the reaction:

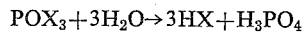

$$POX_3 + 3H_2O \rightarrow 3HX + H_3PO_4$$

where X is chlorine or bromine. Another, preferred, method of forming the hydrohalic acid in situ is to use phosphorus pentahalide in place of all or part of the phosphorus oxyhalide and to employ a sufficient amount of water to decompose this material as shown by the reaction:

$$PX_5 + H_2O \rightarrow 2HX + POX_3$$

where X again is chlorine or bromine.

The novel process of this invention is illustrated by the following generalized representation:

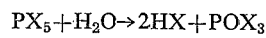

$$3Z_aYH_{b+c} + 3cCH_2O + cPOX_3 \xrightarrow{HX} 3Z_aYH_b(CH_2X)_c + cH_3PO_4$$

wherein "Y" is a cylic structure containing carbon atoms or carbon atoms plus up to three atoms of sulfur and/or nitrogen, such as the cyclic structures in mononuclear aromatics, dinuclear aromatics, trinuclear aromatics, tetranuclear aromatics, pentanuclear aromatics, heterocyclics with aromatic properties, condensed alicyclic-aromatics, condensed heterocyclic-aromatics or polyheterocyclics with aromatic properties; "Z" is a halogen such as iodine, chlorine, bromine or fluorine or an inorganic or organic radical, such as nitro, sulfo, alkyl, amino, aralkyl, carboxyl, amyl, bi-phenyl, butoxy, butyl, sec-butyl, t-butyl, caproyl, capryl, carbethoxy, carbomethoxy, cetyl, cresoxy, cresyl, cyclobutyl, cyclohexyl, cyclopentyl, cyclopropyl, decyl, dodecyl, ethoxy, ethyl, heptyl, hydroxy, isobutoxy, isobutyl, methoxy, methyl, morpholinyl, naphthoxy, naphthyl, octyl, phenethyl, phenoxy, propoxy, propyl, toloxy, tolyl and xylyl; "$a$" is an integer with a value depending upon the specific cyclic structure, and "$b$" is the number of hydrogen atoms attached to the cyclic structure that do not enter into the chloromethylation or bromoethylation reaction; and "$c$" is an integer with a value of at least 1. $POX_3$ in the foregoing equation can be $PX_5$ if an equimolar amount of water is used.

Examples of Y in the formula include the cyclic structures present in benzene, naphthalene, phenanthrene, anthracene, chrysene, hydrindene, perylene, pyrene, thiophene, pyrrole, pyrazole, benzothiophene, dibenzothiophene, indole, 1,2,3,4-tetrahydronaphthalene. X in the formula is chlorine, or bromine. Y may be carbocyclic or heterocyclic.

It becomes, therefore, a primary object of this invention to provide a new method of producing unique halomethylated aromatic compounds derived from sources rich in complex, polynuclear, high-molecular-weight aromatic hydrocarbons.

Another object of this invention is to provide a new method of chloromethylating aromatic and heterocyclic and carbocyclic hydrocarbons having at least one replaceable nuclear hydrogen which comprises reaction of said hydrocarbons with phosphorus oxychloride or phosphorus oxybromide, or with phosphorus pentachloride and water or phosphorus pentabromide and water, in the presence of a formaldehyde-producing agent and a hydrohalic acid.

Another object of this invention is to provide a method utilizing synthetic or naturally-occurring mixtures rich in complex, polynuclear, aromatic hydrocarbons.

Another object of this invention is to provide a method for the production of a chloromethylated aromatic compound, such as chloromethyltoluene, also known as ω-chloro-p-xylene, where the chloromethyl group is directed almost exclusively to the para position to a substituted group. This is unique for chloromethylation using phosphorus oxychloride, or phosphorus pentachloride and water (phosphorus oxychloride-producing material).

Still a further object of this invention is to provide an improved method of producing chloromethylated, complex polynuclear, aromatic compounds of high-molecular-weight, as derived from solvent extracts obtained in the solvent refining of mineral lubricating oils.

Another object of the invention is to provide a new method of chloromethylating aromatic hydrocarbons having at least one replaceable hydrogen atom derived from solvent extracts by reaction with phosphorus oxychloride or with phosphorus pentachloride and water and a formaldehyde-producing agent in the presence of a catalytic amount, i.e., about 0.01 to 5.0% by weight, of a hydrohalic acid, based on the total weight of reactants.

Another object is to provide a method of preparing substantially pure terephthalic acid from toluene.

These and other objects of this invention will be described or become apparent as the specification proceeds.

A feature of this invention is the discovery that, in general, compounds of aromatic nature can be chloromethylated in an essentially anhydrous medium more efficiently by using phosphorus oxychloride, or phosphorus pentachloride and water and a formaldehyde-producing agent in the presence of hydrogen chloride. This reaction has further been found to apply to the complex, high-molecular-weight, polynuclear aromatic compounds present in solvent extracts from the refining of mineral lubricating oils. Because of the complex nature of these aromatic compounds, many of which are characterized by the presence of combined sulfur oxygen and nitrogen atoms in the molecules, this discovery is considered to be particularly noteworthy.

The starting materials useful in the present reaction, coming within the general formula heretofore set forth, include benzene, toluene, ethyl benzene, xylene, m-xylene, p-xylene, naphthalene, phenanthrene, anthracene, chrysene, pyrene, perylene, and derivatives thereof, obtained from synthetic or petroleum sources, particularly toluene-containing fractions and solvent extracts; and aromatic compounds containing ortho- and para-directing substituents such as $CH_2R$, Cl, Br, and I. Accordingly the starting materials which can be used to prepare predominantly para-substituted halomethylated products include, but are not limited to, chlorobenzene, butoxybenzene, the cresols, the xylenes, cyclobutylbenzene, ethoxybenzene, fluorobenzene, octylbenzene, propoxybenzene, chloronaphthalene, bromonaphthalene, ethoxynaphthalene, etc.

The preferred starting material is toluene, and fractions containing same. Another preferred starting material, because it represents a convenient and inexpensive source of aromatics, comprises those materials of aromatic character obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS at 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se; extract, predominating in complex aromatic constituents, is distinctively useful in accordance with this invention.

For example, a crude oil from an east Texas field with an API gravity of 33.1 was topped to remove such light fractions as gasoline, naphtha, kerosine, and a light lubricating distillate. A second lubricating distillate cut was then obtained which had a viscosity of 240 SUS at 100° F., 1.0% sulfur, and an API gravity of 24.5. This oil was treated with phenol to produce a raffinate from which a high-quality lubricating oil could be prepared. The oil extracted by phenol treatment, after removal of phenol, is ready for use as the starting material in accordance with this invention.

Solvents other than phenol may be used to obtain the extraction product used in accordance with this invention, for example, liquid sulfur dioxide, nitrobenzene, chlorex, chlorophenol, trichloroethylene, cresylic acid, pyridine, furfural, or the Duo-Sol solution (comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

Table I
SOURCES AND PHYSICAL CHARACTERISTICS OF SOLVENT EXTRACTS

| Ext. No. | Crude Source | Solvent | API Grav. | Sp. gr. at 10° F. | Vis/100° F. | Vis/130° F. | Vis/210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs. | Phenol | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | do | Nitrobenzene. | 10.0 | 1.000 | | | 1,500 | | +75 | 555 | 640 | 60 | | |
| 13 | Mid-Cont | Propane cresol. | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 87.0% aromatics, 13% saturates analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts from lubricating oil stocks used as starting materials for this invention, have the following general properties and characteristics.

Table II

| Characteristic: | Range of value |
|---|---|
| Gravity, ° API | 7.3–17.6 |
| Gravity, Sp., 60/60° F. | 0.949–1.020 |
| Viscosity SUS at 210° F. | 41–1500 |
| Viscosity index | −153 to +39 |
| Pour point (max.), ° F. | +20–100 |
| Molecular weight, average | 320–750 |
| Sulfur, percent wt. (above about 0.5) | 0.5 to 4.5 |
| Aromatic compounds, percent (including heterocyclics) | 75–98 |
| Av. No. of rings/mean arom. mol. | 1.7–5.0 |

The specific gravities of the extracts in general increase with increase in the viscosity of the raffinate at a constant viscosity index. Stated otherwise, the specific gravities of these extracts increase with decrease in viscosity index of the raffinate at a constant viscosity. In the production of 100±5 VI neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and heterocyclic compounds in the range of 75–98%, the remainder being principally saturates, or material behaving as saturates, together with a minor proportion of up to 7% of organic acids. The organic acids present are not susceptible to extraction by the use of aqueous strong caustic because of the solubility of the sodium salts of the acids in the oil. Little or no asphaltic material is present in solvent extracts and they contain no materials volatile at room temperature.

The data shown in Tables I and II are merely illustrative and the invention is not to be limited thereby.

It is apparent that the characteristics of the final halomethylated product will vary, depending on the concentration and types of aromatic starting materials employed. In such complicated mixtures as solvent extracts from lubrication oil fractions, the content of reactable materials may vary from about 30% to 100% by weight of the aromatic and heterocyclic material present.

In carrying out the process of this invention, either formaldehyde, paraformaldehyde or trioxymethylene can be used as the formaldehyde-producing agent. Any formaldehyde polymer yielding substantially anhydrous formaldehyde under the conditions of the process may be employed in this process. Ordinarily, the stoichiometric amount (based on the chlorine content of the product), or slightly more than the stoichiometric amount of formaldehyde (or formaldehyde polymer) is used in our process. Trioxymethylene can also be used as the source of formaldehyde. Aqueous solutions of formaldehyde, such as formalin, cannot be used in the present process. The reaction does not proceed with phosphorus pentachloride alone or with phosphorus trichloride, but it does proceed with phosphorus pentachloride containing not more than 1 mole of water per mole of the phosphorus pentachloride because phosphorus pentachloride is converted into phosphorus oxychloride and hydrogen halide by the water.

The preferred reaction temperature is approximately 80° to 90° C., and as high as 120° C., for best results, although the process may generally be carried out at temperatures from 70°–130° C. The use of higher temperatures may favor condensation of the aromatic material to higher-molecular-weight substances at the expense of chloromethylated products.

For this chloromethylation or bromomethylation process, sufficient phosphorus oxychloride or oxybromide or phosphorus pentachloride (with water) or pentabromide (with water) or their mixtures are used to furnish the halogen in the halomethylated product. Stoichiometrically, one mol of phosphorus oxychloride or phosphorus pentachloride (with water), to illustrate, is required for each three mols of formaldehyde, which then react with the aromatic to form the chloromethylated product.

A solvent composed of one or more paraffinic or cycloparaffinic hydrocarbons not susceptible to chloromethylation may be used to dissolve the aromatic reactant prior to halomethylation by this process. The solvent used must boil substantially below or substantially above the initial boiling point of the halomethylated product so that it can be removed from the halomethylated product by distillation.

This process may be carried out either batchwise or continuously. Whatever process is used, provision must be made for controlling temperature since the reaction is exothermic. It is carried out best at approximately 90° C. Under such conditions, the reactants should be maintained in contact with one another until the exothermic reaction has subsided. This period may be as long as thirty-sixty minutes. Further heating will lower the yields of halomethylated products and increase the yield of diarylmethane.

In order to demonstrate the invention, the following examples are given.

EXAMPLE I

In a three-necked flask fitted with a mechanical stirrer, a dropping funnel, a gas inlet tube, a thermometer and a condenser, were placed 40 grams of paraformaldehyde and 82.8 grams of toluene. A slight current of hydrogen chloride was passed into the stirred mixture while it was brought to 90° C. by means of a Glas-Col heater. The current of hydrogen chloride and stirring of the mixture were continued while 45.9 grams of phosphorus oxychloride was added dropwise over a period of 26 minutes. Stirring of the mixture and the slight stream of hydrogen chloride were continued for a further 15 minutes, after which the mixture was allowed to cool. The hydrocarbon layer was separated from the mixture, washed with water, with sodium bicarbonate solution, and finally again with water, and then was dried over calcium chloride. Upon distillation, it yielded 29.4 grams of ω-chloro-p-xylene, 27.4 grams of di-(p-tolyl)methane and 20 grams of higher boiling products. Although both the ω-chloro-p-xylene and di-(p-tolyl) methane are readily oxidizable to terephthalic acid, the former gives by far the greater yield and is the preferred product. This shows that ω-chloro-p-xylene is almost exclusively formed, with little or no ω-chloro-o-xylene. The chloromethyl group is directed almost exclusively (98%) to the para position.

EXAMPLE II

The procedure of this example was similar to that of Example I, except that (a) only 27 grams of paraformaldehyde was used, (b) the phosphorus oxychloride was added over a period of 83 minutes, (c) hydrogen chloride gas was introduced into the vapor space above the stirred mixture in the reaction flask rather than being bubbled through the stirred mixture, and (d) the mixture was allowed to cool immediately after the addition of phosphorus oxychloride had been completed. The yield of ω-chloro-p-xylene was 33 grams and the yield of higher boiling products was 39 grams.

EXAMPLE III

The procedure of this example was similar to that of Example I, except that (a) no hydrogen chloride was passed into the mixture, (b) 27 grams of paraformaldehyde was used, (c) the phosphorus oxychloride was added over a period of 21 minutes, (d) the reaction was not uniform, but tended to occur violently after most of the phosphorus oxychloride had been added, and (e) the mixture was allowed to cool immediately after all of the phosphorus oxychloride had been added. The yield of ω-chloro-p-xylene was 9.5 grams and the yield of higher-boiling products was 48 grams. In a check run under approximately the same conditions the reaction occurred violently near the end of the phosphorus oxychloride addition and the yield of ω-chloro-p-xylene obtained was approximately 1 gram, with 44 grams of higher boiling products.

It is thus seen from the results of this example and its check run that (a) the yield of ω-chloro-p-xylene is greatly inferior to that obtained when the reaction was conducted in the presence of hydrogen chloride, and (b) hydrogen chloride moderates the reaction.

EXAMPLE IV

This example was conducted in a fashion similar to that of Example I, except that (a) 27 grams of paraformaldehyde was used, (b) no phosphorus oxychloride was used, and (c) the stream of hydrogen chloride was passed through the mixture of paraformaldehyde and toluene for 2 hours at 86° C. There was no yield of ω-chloro-p-xylene, di-(p-tolyl)methane or higher-boiling products.

The results of this example show that under the conditions used, hydrogen chloride and paraformaldehyde will not chloromethylate toluene unless phosphorus oxychloride is also present. On the other hand, phosphorus oxychloride and paraformaldehyde do chloromethyate toluene, but the product is largely di-p-tolylmethane and higher boiling products, rather than the desired ω-chloro-p-xylene. Hydrogen chloride, however, when used along with phosphorus oxychloride and paraformaldehyde, results in a very marked increase in the yield of ω-chloro-p-xylene. The yield of ω-chloro-p-xylene is several times as great as when hydrogen chloride is not used.

EXAMPLE V

Example V was carried out similarly as Example I, except that (a) 41 grams of phosphorus trichloride was used instead of the phosphorus oxychloride, (b) the time of addition of the phosphorus trichloride was 13 minutes, and (c) the hydrogen chloride addition and stirring were continued for 11 minutes after the addition of phosphorus trichloride was completed. There was no formation of ω-chloro-p-xylene, di-p-tolylmethane, or higher-boiling products. Thus, it is apparent that phosphorus trichloride is not a chloromethylating agent when used with paraformaldehyde and hydrogen chloride.

EXAMPLE VI

Benzene (78 gms.), paraformaldehyde (30 gms.), and phosphorus oxychloride (51.1 gms.), were reacted as in Example I in the presence of gaseous hydrochloric acid. The chloromethylated product contained chlorine which was reactive to silver nitrate, showing that chloromethylation had taken place.

EXAMPLE VII

Naphthalene (51.3 gms.), paraformaldehyde (15 gms.) and phosphorus oxychloride (61 gms.), were reacted as in Example I in the presence of gaseous hydrochloric acid. The chloromethylated product contained chlorine which was reactive to silver nitrate, showing that chloromethylation had taken place.

EXAMPLE VIII

The process of Example VI was repeated using trioxymethylene in place of paraformaldehyde and chloromethylated benzene resulted.

EXAMPLE IX

In a three-necked flask, fitted with a mechanical stirrer, a dropping funnel, a gas inlet tube, and a condenser, were placed 30 grams of paraformaldehyde, and 82.8 grams of toluene. A current of hydrogen chloride was passed into the stirred mixture while it was brought to 80° C. by means of a Glas-Col heater. The current of hydrogen chloride and stirring of the mixture were continued while 45.9 grams of phosphorus oxychloride was added over a period of 60 minutes. The temperature of the mixture was maintained between 80–90° C. by using an ice bath around the reaction flask. The mixture was cooled; the hydrocarbon layer was separated, then washed with water, saturated sodium bicarbonate solution and finally with water and then was dried over calcium chloride. Upon distillation, it yielded 33 g. of p-(chloromethyl)toluene and 39 grams of higher boiling products.

A mixture of 3.5 grams of p-(chloromethyl)toluene, 15 grams of potassium permanganate in 200 cc. of water, and a few drops of sodium hydroxide solution was heated under reflux for 10 hours. The solution was then made strongly alkaline by the addition of sodium hydroxide, heated to convert all of the organic acids into their sodium salts and finally filtered. The filtered solution was acidified with hydrochloric acid and the precipitated organic acid was filtered hot and washed with successive portions of hot water to remove the trace of orthophthalic acid. The yield of dry terephthalic acid was 2.1 grams. The hot water washings were concentrated to a small volume and cooled with ice to precipitate the orthophthalic acid. The yield of orthophthalic acid obtained was 0.05 gram.

EXAMPLE X

A mixture of 92 g. of toluene, 92 grams of Formalin (aqueous 40% formaldehyde solution) and 460 grams of 37% hydrochloric acid solution was stirred mechanically at 65° C. for 6 hours while a stream of hydrogen chloride was passed through the mixture. The hydrocarbon layer was then separated, diluted with 200 cc. of ether and the mixture washed successively with water, sodium bicarbonate solution and finally with water, then dried over calcium chloride and distilled. The yield of chloromethyl toluene isomers was 50.2 grams.

A mixture of 7 grams of the chloromethyl toluene isomers, 28.2 grams of potassium permanganate, 400 cc. of water and a few drops of sodium hydroxide solution was heated under reflux for 10 hours. The solution was then worked up as in Example IX except that the water washing of the mixed organic acids was carried out exhaustively. The yield of terephthalic acid was 3.9 grams and that of o-phthalic acid was 1.5 grams.

A comparison of the results of Example IX with Example X showed (a) that the terephthalic acid produced in Example IX (use of phosphorus oxychloride in the chloromethylation step) contained approximately 2% o-phthalic acid, which was removed with little difficulty and (b) that the phthalic acid product from Example X (prepared by oxidation of the product formed by chloromethylation of toluene according to an older well known method) was composed of 70% terephthalic acid and 30% o-phthalic acid.

EXAMPLE XI

In a three-necked flask fitted with a mechanical stirrer, a condenser and a thermometer, were placed 30 grams of paraformaldehyde and 82.8 grams of toluene, and the temperature of the stirred mixture was brought to 84° C. by means of a Glas-Col heater. While the mixture was continuously stirred, a total of 62.4 grams of phosphorus pentachloride was added in increments of 0.5 to 0.75 gram over a period of 32 minutes. During the same time interval, 2.4 grams of water was added dropwise. After all of the phosphorus pentachloride and water had been added, the stirring was continued for 6 minutes, after which the mixture was allowed to cool. Approximately 75 cc. of toluene was added and the mixture allowed to settle. The liquid layer was separated and washed with water, with saturated sodium bicarbonate solution, and again with water, after which it was filtered through paper and dried over calcium chloride. Upon fractional distillation, it yielded 20 grams of ω-chloro-p-xylene, 20 grams of di-(p-tolyl)methane and 20 grams of higher boiling products.

EXAMPLE XII

This example was carried out similarly to Example XI, except that no water was added. No ω-chloro-p-xylene or higher condensation products were obtained.

This example shows that phosphorus pentachloride and paraformaldehyde do not bring about chloromethylation of toluene unless water is used simultaneously as in Example XI. This demonstrates that in accordance with one feature of this invention the halomethylation reaction can be conducted in the presence of a phosphorus halide with just sufficient water to form phosphorus oxyhalide as the reactant. The addition of water in excess of one mole per mole of phosphorus pentahalide results in the decomposition of the active chloromethylating agent, phosphorus oxyhalide.

The invention has been illustrated by a number of examples using toluene and other aromatics as the source of compounds having a replaceable hydrogen atom. The toluene used for the reaction can be obtained in the distillation of the light oil from scrubbing coal gas, after benzene removal. The toluene can be from petroleum sources, i.e., from benzene, toluene, and xylene fractions obtained by the solvent extraction of reformate fractions and other sources well known in the art. For best results, when our process is directed to the ultimate preparation of terephthalic acid, relatively pure toluene should be used, i.e., containing no more than about 0.5 to about 2.0% of impurities in the form of related aromatics. Since substantially pure toluene is a readily available raw material the process of this invention is adapted to prepare substantially 100% pure terephthalic acid suitable, without further purification, for the preparation of resins and the like.

The oxidation of alkyl side chains on aromatic nuclei to carboxyl groups is a well known reaction. This conversion can be carried out with dilute nitric acid, concentrated nitric acid, catalytic oxidation in the liquid phase using butyric acid as the solvent, oxygen as the oxidizing agent, and acetates of lead, cobalt and manganese as catalysts. Permanganate oxidation can also be used, particularly using alkaline permanganate. Other known methods may be used.

Lubricating oil extracts represent another preferred source material for the reaction because not only does the halomethylated product represent a useful intermediate from which further products can be made, but the products also represent the utilization of material which is ordinarily discarded as a waste product. Solvent extracts are further characterized by their complexity, which gives unique properties to the halomethylated product. The average molecular weight of solvent extracts obtained in the preparation of 200 vis. neutral oils is about 340. These extracts contain about 75% to 87% of complex aromatic hydrocarbons and heterocyclics of aromatic character having an average of about 2.7 carbon rings per aromatic molecule. The polynuclear aromatics from petroleum sources contain a predominance of aromatic substances having two to three carbon rings per aromatic molecule and having an average molecular weight of above 300.

The extracts obtained during the manufacture of 150–160 vis. bright stocks contain from 85% to 98% of complex aromatics and heterocyclics having an average of about 3.3 carbon rings per aromatic molecule. When a typical solvent extract was subjected to carbon-type analysis using the method of Kurtz, King, Stout, Partikan and Skrabek (Anal. Chem. 28, 1928 (1956)), the results were: $C_a$ 39%, $C_n$ 30% and $C_p$ 31%. In this analysis $C_p$ includes only the carbon atoms present as paraffins and side chains on aromatic and naphthenic rings, $C_n$ includes only the carbon atoms present in naphthenic rings, and $C_a$ includes only the carbon atoms present in aromatic rings. This same extract, No. 43 in Table I, had an average molecular weight of 340, contained 87% aromatics (and heterocyclics of aromatic type), as determined by the silica gel procedure, showed 13% saturated hydrocarbons, etc., and analyzed 86.4% carbon and 10.7% hydrogen.

The complexity of the types of compounds present, as based on these analyses, is illustrated by the following table:

*Table III*

ESTIMATED CHEMICAL COMPOSITION OF SOLVENT EXTRACTS NOS. 43 AND 44 OF TABLE I

| Type of compound: | Approx. percent in the extract |
|---|---|
| Saturated hydrocarbons | 12.5 |
| Mononuclear aromatics (substituted benzenes) | 25.0 |
| Dinuclear aromatics: Substituted naphthalenes | 30.0 |
| Trinuclear aromatics— | |
| Substituted phenanthrenes | 10.0 |
| Substituted anthracenes | 5.0 |
| Tetranuclear aromatics— | |
| Substituted chrysenes | 0.5 |
| Substituted benzphenanthrenes | 0.2 |
| Substituted pyrenes | 0.2 |
| Pentanuclear aromatics: Perylene | 0.01 |
| Sulfur compounds,[1] oxygen compounds, etc. | 16.5 |

[1] Mainly heterocyclic compounds.

Any portion of the reactive aromatic constituents in solvent extracts may be isolated therefrom, or from other sources, to be used as starting materials for the reaction with the formaldehyde-producing agent and the phosphorus oxychloride. For example, solvent extracts may be distilled and selected fractions thereof used as the starting materials. The content of reactive, complex, polynuclear, aromatic compounds and heterocyclics present in solvent extracts, as illustrating a preferred source material, may vary, depending on the type of solvent, the extraction process applied and the mineral oil treated, although the types of compounds present in the extract are not so varied. Extracts containing from about 30% to 90% of reactive polynuclear aromatics and heterocyclics of aromatic nature represent a preferred type of starting material.

The halomethylated complex aromatic materials described herein find utility in lubricating oil compositions wherein they exhibit extreme pressure properties and are also useful as intermediates for the preparation of alcohols and dialcohols. The utility of these products as extreme pressure agents is shown by the four-ball bench tests set forth in said copending application.

As seen from these examples we have found that when this chloromethylation process is carried out in the presence of hydrogen chloride, the chloromethylated derivative becomes the principal product and the di-arylmethane the minor product. Thus, as shown in Examples I and II, ω-chloro-p-xylene is the principal product formed when toluene is chloromethylated with phosphorus oxychloride, paraformaldehyde and hydrogen chloride, whereas p-ditolylmethane is the principal product when the hydrogen chloride is omitted. Mere traces of hydrogen chloride are not sufficient to bring about this increased yield of ω-chloro-p-xylene, but the proportion of hydrogen chloride used in the process can be very much less than that which corresponds to the chlorine in the product. Hydrogen chloride itself cannot be substituted for the phosphorus oxychloride, as shown in Example IV.

The reaction involved in this process may be represented as follows, using toluene as the example:

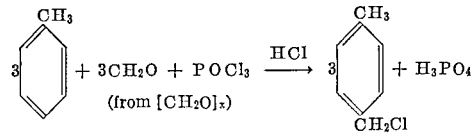

In this process a reactive intermediate is probably formed which can be converted into two possible products (1) the chloromethylated product, and (2) the diarylmethane. The hydrogen chloride, if present, tips the scales in the direction of the chloromethylated product. In the case of toluene, quite unexpectedly, the para isomer is formed almost exclusively.

In adding hydrogen chloride as such during the operation of this process, the reactants are maintained under substantially anhydrous conditions, i.e., no more than about 1.0% of water. When the hydrogen chloride is generated in situ by adding an excess of phosphorus oxychloride and just sufficient water added to decompose the excess phosphorus oxychloride, or phosphorus pentachloride, as the case may be, leaving the desired amount of phosphorus oxychloride as a reactant, the amount of water used is no more than about 1.0% above stoichiometric amounts for this purpose. In case an excess of phosphorus oxychloride is used (with water) this excess should amount preferably to 1-20% of that required for the chloromethylation process itself.

In the instant chloromethylation process an inert solvent may be used, particularly if the material to be chloromethylated is very viscous or in the solid state. The process of the instant invention is applicable to any aromatic substance having one or more reactable hydrogen atoms per molecule and having no group present which interferes with the reaction.

As is apparent from the foregoing description, the invention relates to a process of preparing halomethylated derivatives selected from the group of bromo-, and chloromethylated derivatives of organic compounds containing at least one replaceable hydrogen atom attached to the nucleus by reaction of such organic compounds with the corresponding phosphorus oxyhalide and a formaldehyde-producing agent in the presence of a hydrohalic acid. The organic compound may be derived from a wide source varying from simple cyclic compounds like benzene, aromatic compounds of simple or complex nature, heterocyclic compounds of simple or complex nature and having aromatic properties, substituted aromatic and heterocyclic compounds having a wide variety of substituent groups to complex polynuclear aromatic hydrocarbons derived from petroleum, e.g., solvent extracts or complex polynuclear aromatic hydrocarbons and heterocyclic compounds containing a predominance of hydrocarbon rings having two to three carbon rings per aromatic molecule or heterocyclic nuclei containing carbon atoms and up to three atoms of sulfur or nitrogen or both per molecule. Also, the starting materials may have a wide variety of substituent groups (Z) attached to the nucleus, such as halogens, sulfo, carboxyl and other groups herein defined. In addition, the invention encompasses the compounds made by the process of using the preferred embodiments of Example I and by using the combination reactants phosphorus oxychloride, and phosphorus oxybromide, and phosphorus pentachloride or bromide (with water) with formaldehyde, or formaldehyde polymers or trioxymethylene. Mixtures of chloromethylated and bromomethylated compounds may be prepared using this invention, either by employing mixed reactants or mixing the finished reaction products. The halo-acid used may contain a halogen atom which is the same as or different from the halogen atom of the halogen-containing phosphorus compound. Lubricating oil compositions containing the reaction products of the instant process are also contemplated. The only limitations applying to the invention appear in the appended claims.

The embodiment of this invention in which an exclusive property or privilege is claimed are defined as follows:

1. The process of preparing parahalomethylated aromatic compounds of the group consisting of parabromomethylated and parachloromethylated derivatives of a monosubstituted benzene selected from the class consisting of toluene, ethylbenzene, butoxybenzene, cyclobutylbenzene, chlorobenzene, ethoxybenzene, fluorobenzene, octyl benzene and propoxy benzene, which consists in reacting about 3 moles of said monosubstituted benzene at a temperature of about 10° to 130° C. with about 3 moles of a formaldehyde-producing agent of the group consisting of formaldehyde, paraformaldehyde, trioxymethylene and mixtures thereof and about 1 mole of the corresponding phosphorus compound of the group consisting of phosphorus oxychloride and phosphorus oxybromide and mixtures thereof in the presence of about 0.01 to 5.0% by weight of a hydrohalic acid based on the weight of said reactants.

2. The process in accordance with claim 1 in which said hydrohalic acid is introduced in gaseous form during said reaction.

3. The process in accordance with claim 1 in which said hydrohalic acid is formed in situ in said reaction.

4. The process in accordance with claim 3 in which said hydrohalic acid is formed by adding an excess of said phosphorus compound and decomposing said excess phosphorus compound by the addition of water during said reaction.

5. The process of producing ω-chloro-p-xylene which comprises reacting about 3 mols of paraformaldehyde with about 3 moles of toluene at a temperature of about 80 to 90° C. in the presence of about 0.01 to about 5.0% by weight of hydrogen chloride based on the total weight of reactants and about 1 mol of phosphorus oxychloride and separating ω-chloro-p-xylene from the reaction products.

6. The process of preparing parabromomethylated toluene which consists in reacting about 3 mols of toluene at a temperature of about 10° to 130° C. with about 3 moles of a formaldehyde-producing agent of the group consisting of formaldehyde, paraformaldehyde, trioxymethylene and mixtures thereof and about 1 mol of phosphorus oxybromide in the presence of about 0.01 to 5.0% by wt. of hydrobromic acid based on the weight of said reactants.

7. The process of preparing parachloromethylated toluene which consists in reacting about 3 moles of toluene at a temperature of about 10° to 130° C. with about 3 moles of a formaldehyde-producing agent of the group consisting of formaldehyde, paraformaldehyde, trioxymethylene and mixtures thereof and about 1 mole of phosphorus oxychloride in the presence of about 0.01 to 5.0% by wt. of hydrochloric acid based on the weight of said reactants.

References Cited by the Examiner

UNITED STATES PATENTS

| | | | |
|---|---|---|---|
| 2,966,514 | 12/1960 | Benning et al. | 260—651 X |
| 3,076,039 | 1/1963 | Ayers et al. | 260—651 X |

OTHER REFERENCES

Adams: "Organic Reactions," vol. 1, pp. 63–90 (1954).

LEON ZITVER, *Primary Examiner.*

K. H. JOHNSON, K. V. ROCKEY, *Assistant Examiners.*